(12) United States Patent
Dallner et al.

(10) Patent No.: US 8,795,833 B2
(45) Date of Patent: Aug. 5, 2014

(54) POLYOXYMETHYLENE LASER SINTERING POWDER, PROCESS FOR ITS PRODUCTION, AND MOLDINGS PRODUCED FROM THIS LASER SINTERING POWDER

(75) Inventors: Claus Dallner, Mannheim (DE); Steffen Funkhauser, Viernheim (DE); Frank Müller, Ludwigshafen (DE); Jürgen Demeter, Mainz (DE); Mark Völkel, Ladenburg (DE)

(73) Assignee: BASF SE, Ludwigshafen (DE)

( * ) Notice: Subject to any disclaimer, the term of this patent is extended or adjusted under 35 U.S.C. 154(b) by 103 days.

(21) Appl. No.: 13/503,990

(22) PCT Filed: Oct. 26, 2010

(86) PCT No.: PCT/EP2010/066107
§ 371 (c)(1),
(2), (4) Date: Apr. 25, 2012

(87) PCT Pub. No.: WO2011/051250
PCT Pub. Date: May 5, 2011

(65) Prior Publication Data
US 2012/0208011 A1  Aug. 16, 2012

(30) Foreign Application Priority Data
Oct. 27, 2009  (EP) .................................... 09174163

(51) Int. Cl.
*C08K 5/10* (2006.01)
*C08K 5/103* (2006.01)
*B32B 5/16* (2006.01)

(52) U.S. Cl.
USPC ........................... 428/402; 524/317; 524/593

(58) Field of Classification Search
USPC .................................. 428/402; 524/593, 317
See application file for complete search history.

(56) References Cited

U.S. PATENT DOCUMENTS 5,342,919 A  8/1994 Dickens, Jr. et al.
5,648,450 A * 7/1997 Dickens et al. ............... 528/323
(Continued)

FOREIGN PATENT DOCUMENTS

DE        4421454 A1   12/1995
EP        0911142 A1   4/1999
WO   WO-96/06881 A2   3/1996

OTHER PUBLICATIONS

Rietzel et al., Investigation of the particular crystallization behaviour of semi-crystalline thermplastic powders processed by selective laser sintering, High Beam Research, Annals of DAAM & Proceedings, Jan. 1, 2010.*

(Continued)

Primary Examiner — Holly Le
(74) Attorney, Agent, or Firm — Drinker Biddle & Reath LLP

(57) ABSTRACT

The invention relates to a polyoxymethylene (POM) powder for use in a selective laser sintering process and having the following parameters:

| | |
|---|---|
| Isothermal crystallization time (at 152° C.) | >3 min |
| Mn | from 22 000 to 25 000 g/mol |
| Mw | from 60 000 to 140 000 g/mol |
| Mw/Mn | from 3 to 5 |
| MVR | from 15 to 70 [cm³/10 min] |
| d50 average particle size | 60 μm |
| Particle size | from 30 to 130 μm. |

A process for producing the powder, and also moldings produced from this powder by a selective laser sintering process, are also described.

6 Claims, 1 Drawing Sheet

(56) References Cited

U.S. PATENT DOCUMENTS

| | | | |
|---|---|---|---|
| 6,136,948 A | 10/2000 | Dickens, Jr. et al. | |
| 6,245,281 B1 | 6/2001 | Scholten et al. | |
| 7,569,273 B2* | 8/2009 | Bredt et al. | 428/402 |
| 7,794,647 B1* | 9/2010 | Deckard | 264/497 |
| 2005/0003189 A1* | 1/2005 | Bredt et al. | 428/402 |
| 2011/0313086 A1* | 12/2011 | Sharavanan et al. | 524/106 |

OTHER PUBLICATIONS

International Preliminary Report on Patentability from PCT/EP2010/066107 dated May 8, 2012.

Rietzel, et al., "New Thermoplastic Powder for Selective Laser Sintering", Kunststoffe International, vol. 98, No. 2, (2008), pp. 42-45.

International Search Report for PCT/EP2010/066107 mailed Jan. 27, 2011.

\* cited by examiner

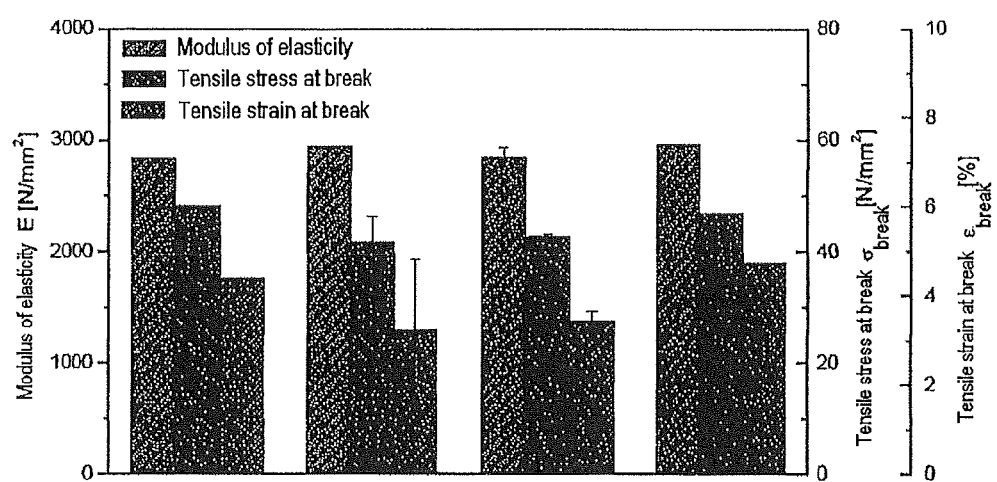

POLYOXYMETHYLENE LASER SINTERING POWDER, PROCESS FOR ITS PRODUCTION, AND MOLDINGS PRODUCED FROM THIS LASER SINTERING POWDER

CROSS-REFERENCE TO RELATED APPLICATIONS

This application is a national stage application (under 35 U.S.C. §371) of PCT/EP2010/066107, filed Oct. 26, 2010, which claims benefit of European application 09174163.7, filed Oct. 27, 2009.

A task often encountered in very recent times is the rapid production of prototypes. Particularly suitable processes are those which operate on the basis of pulverulent materials and in which the desired structures are produced layer-by-layer via selective melting and solidification. The processes are also suitable for producing small runs.

The invention relates to a polyoxymethylene (POM) powder for use in a selective laser sintering process, to a process for producing the powder, and also to moldings produced from this powder by a selective laser sintering process.

One process with particularly good suitability for rapid-prototyping purposes is selective laser sintering (SLS). This process uses plastics powders, plastics-coated metal powders, or plastics-coated ceramic powders, or plastics-coated sand, and irradiates these briefly and selectively with laser beam in a chamber, thus melting the powder particles exposed to the laser beam. The molten particles coalesce and rapidly harden again to give a solid mass. Repeated irradiation of a constant succession of freshly applied layers in this process can give simple and rapid production of three-dimensional products, even those of complex shape.

The laser sintering (rapid-prototyping) process for producing moldings from pulverulent polymers is described in detail in the specifications U.S. Pat. No. 6,136,948 and WO 96/06881 (both from DTM Corporation). A wide variety of polymers and copolymers can be used for this application, examples being polyacetate, polypropylene, polyethylene, ionomers, and polyamide. A precondition for SLS processing is that the material is a fine powder.

In practice, a particular material used to produce moldings by the laser sintering process is nylon-12 powder (PA 12) (DE-A 4421454, EP-A 0 911 142). Although other thermoplastics, such as polystyrene or polycarbonate, are obtainable in pulverulent form, they give components with high porosity and poor mechanical properties.

Disadvantages of the polyamide powders currently used are often again unsatisfactory mechanical properties, and also the glass transition temperature in the region of about 60° C. which is often relevant to the application. The moldings moreover suffer from yellowing, which can arise during subsequent use of the finished component if it is exposed to intense irradiation with UV-containing light, or else to long periods of direct insolation.

However, it is even possible that a yellow tinge is produced simply by virtue of the long period of intense thermal stress during the laser sintering process. This effect is observed particularly when using large proportions of recycled powder, which is a laser sintering powder that has been used previously, but without melting. The yellowing is often attended by impairment of mechanical properties, since ageing of the material occurs. The ageing can be diskernible by way of example through embrittlement, reduced tensile strain at break, or reduced notched impact resistance.

U.S. Pat. No. 5,342,919 describes laser sintering powders made of polyamide, polybutylene terephthalate, or polyacetal, and the use of these for producing moldings by SLS. The average particle size of more than 80% of the powder is <53 µm, and the size of the remaining particles is from 53 to 180 µm. The number-average molecular weight of the polymer is from 30 000 to 500 000, and the molecular-weight polydispersity $M_w/M_n$ is from 1 to 5. The moldings feature low porosity in comparison with compact nonporous injection moldings.

Rietzel et al. (Kunststoffe 2/2008, pp. 65-86) report on POM powders for SLS and on components produced therefrom by SLS. The POM sinter powder is obtained by cryogenic grinding of commercially available semicrystalline thermoplastics in granule form, and the intention was to obtain a high yield of particles below 100 µm. When tensile specimens made of this POM laser sintering powder were compared with tensile specimens made of the commercially available laser sintering powder PA 2200 (producer: EOS GmbH, Krailling) the former have higher strength for lower tensile strain at break.

However, there remains a need for improvement to the mechanical properties of the POM sinter powder described by Rietzel et al., an example being tensile strain at break. Another disadvantage is the unsatisfactory flowability of said POM sinter powder.

It is an object of the present invention to provide a powder for selective laser sintering which has improved flowability and which when used in the SLS process can produce moldings and, respectively, components with improved mechanical properties.

It has now been found possible to achieve this object by using a specific polyoxymethylene powder.

The invention provides a POM powder which is intended for selective laser sintering and which has the following parameters:

| | |
|---|---|
| isothermal crystallization time (at 152° C.) | >3 min |
| Mn | from 22 000 to 25 000 g/mol |
| Mw | from 60 000 to 140 000 g/mol |
| Mw/Mn | from 3 to 5 |
| MVR | from 15 to 70 [cm³/10 min] |
| d50 average particle size | 60 µm |
| particle size | from 30 to 130 µm. |

A BRIEF DESCRIPTION OF THE FIGURE

FIG. 1 shows that tensile specimens made of the POM powder of the invention have markedly improved tensile strain at break in comparison with POM specimens of the prior art [Rietzel et al. (Kunststoffe 2/2008, p. 67)].

A DETAILED DESCRIPTION OF THE INVENTION

Isothermal crystallization time was determined by DSC to DIN 53765. Molar mass (number-average Mn and weight-average Mw) was determined by size exclusion chromatography in hexafluoroisopropanol and 0.05% of potassium trifluoroacetate as solvent, with calibration by PMMA standards. MVR (melt volume rate) was determined to ISO 1133, at 190° C. for 2.16 kg. Particle size was determined by a laser-diffraction spectrometer.

The weight-average Mw of the POM powder of the invention is preferably from 85 000 to 105 000 g/mol. The Mw/Mn ratio is preferably from 3.7 to 4.5. MVR is preferably from 30 to 50 [cm³/10 min]. It is further preferable that the particle size of the powder is from 40 to 100 µm, particularly from 60 to 80 μm. Isothermal crystallization time at 152° C. is generally greater than 3 minutes and preferably greater than 5 minutes.

The powder of the invention can, if appropriate, comprise additives, for example at least one auxiliary, at least one filler, and/or at least one pigment. These auxiliaries can by way of example be powder-flow aids, e.g. fumed silicon dioxide, or else precipitated silica. Fumed silicon dioxide (fumed silica) is supplied by way of example with the product name Aerosil®, with various specifications, by Degussa AG. The powder of the invention preferably comprises less than 3% by mass of these added materials, based on the entirety of the polyoxymethylene, preferably from 0.001 to 2% by mass, and very particularly preferably from 0.05 to 1% by mass. The fillers can by way of example be glass particles, metal particles, in particular aluminum particles, or ceramic particles, for example solid or hollow glass beads, steel shot, aluminum shot, or metal granules, or else chromatic pigments, e.g. transition metal oxides. Stabilizers, adsorbents, or flame retardants can also be added.

The average grain size of these filler particles is preferably smaller than or approximately the same as that of the POM particles. The amount by which the d50 average grain size of the POM exceeds the d50 average grain size of the fillers should preferably be no more than 20%, preferably no more than 15%, and with particular preference no more than 5%. Limits on particle size here are: an upward limit in particular due to layer thickness, and a downward limit due to the production process, and also the excessive adhesive interaction and resultant low flowability that occur if particles are too small.

The additives are incorporated into the POM powder by mixing. In principle, any type of mixer is suitable for this purpose; preference is given to use of a high-speed mixer, where this can give a high level of shear during the mixing process and thus considerably shorten mixing time (less than 45 minutes).

The invention further provides a process for producing the powder of the invention, which comprises firstly carrying out low-temperature grinding of a polyoxymethylene molding composition characterized by the following parameters:

| | |
|---|---|
| isothermal crystallization time (at 152° C.) | >3 min |
| Mn | from 22 000 to 25 000 g/mol |
| Mw | from 60 000 to 140 000 g/mol |
| Mw/Mn | from 3 to 5 |
| MVR | from 15 to 70 [cm³/10 min]; | and then removing the coarse fraction and the fines from the resultant ground POM, and obtaining the useful POM fraction of particles of size from 30 to 130 μm.

Polyoxymethylene is a polyoxymethylenehomo- or copolymer. These polymers are known to the person skilled in the art and are described in the literature.

These polymers very generally have at least 50 mol % of recurring —CH$_2$O— units in their main polymer chain.

The homopolymers are generally produced by polymerizing formaldehyde or trioxane, preferably in the presence of suitable catalysts.

For the purposes of the invention, preference is given to polyoxymethylene copolymers, especially those which, besides the recurring —CH$_2$O— units, also have up to 50 mol %, preferably from 0.1 to 20 mol %, in particular from 0.3 to 10 mol %, and very particularly preferably from 0.2 to 5 mol %, of recurring units

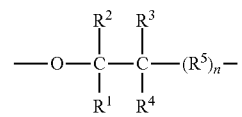

where $R^1$ to $R^4$, independently of one another, are hydrogen, a $C_1$-$C_4$-alkyl group or a halogen-substituted alkyl group having from 1 to 4 carbon atoms, and $R^5$ is —CH$_2$—, —CH$_2$O—, a $C_1$-$C_4$-alkyl- or $C_1$-$C_4$-haloalkyl-substituted methylene group, or a corresponding oxymethylene group, and n is from 0 to 3. These groups may be advantageously introduced into the copolymers by ring-opening of cyclic ethers. Preferred cyclic ethers have the formula

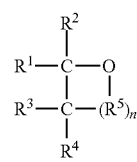

where $R^1$ to $R^5$ and n are as defined above. Mention may be made, merely as examples, of ethylene oxide, propylene 1,2-oxide, butylene 1,2-oxide, butylene 1,3-oxide, 1,3-dioxane, 1,3-dioxolane and 1,3-dioxepane as cyclic ethers, and also linear oligo- and polyformals, such as polydioxolane or polydioxepane as comonomers.

Other suitable components are oxymethylene terpolymers, produced, for example, by reacting trioxane, one of the cyclic ethers described above and a third monomer, preferably bifunctional compounds of the formula

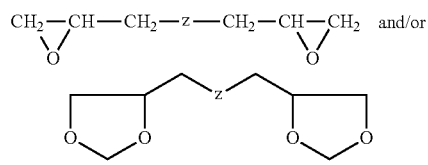

where Z is a chemical bond, —O—, —ORO— (R=$C_1$-$C_8$-alkylene or $C_2$-$C_8$-cycloalkylene).

Preferred monomers of this type are ethylene diglycide, diglycidyl ether and diethers derived from glycidyl compounds and formaldehyde, dioxane or trioxane in a molar ratio of 2:1, and also diethers derived from 2 mol of glycidyl compound and 1 mol of an aliphatic diol having from 2 to 8 carbon atoms, for example the diglycidyl ethers of ethylene glycol, 1,4-butanediol, 1,3-butanediol, 1,3-cyclobutanediol, 1,2-propanediol or 1,4-cyclohexanediol, to mention merely a few examples.

Processes for preparing the homo- and copolymers described above are known to the person skilled in the art and described in the literature, and further details are therefore superfluous here.

The molecular weight of the homo- and copolymers described above can be adjusted by using acetals of formaldehyde (chain-transfer agents). These also lead to production of etherified end groups in the polymer, and there is therefore no need for any separate reaction with capping reagents.

Chain-transfer agents used are monomeric or oligomeric acetals of formaldehyde.

Preferred chain-transfer agents are compounds of the formula $$R^1\text{—}(O\text{—}CH_2)_q\text{-}O\text{—}R^2,$$

in which $R^1$ and $R^2$, independently of one another, are monovalent organic radicals, preferably alkyl radicals, such as butyl, propyl, ethyl and methyl, and q is a whole number from 1 to 100.

Particularly preferred chain-transfer agents are compounds of the abovementioned formula in which q=1, and very particular reference is given to butylal, propylal, ethylal, and methylal.

The amounts usually used of the chain-transfer agents are up to 5000 ppm, preferably from 100 to 3000 ppm, based on the monomer (mixture).

The POM can comprise up to 50% by weight (based on 100% by weight of POM) of other additives.

Examples of suitable additives are:

talc,
polyamides, in particular copolyamides,
alkaline earth metal silicates and alkaline earth metal glycerophosphates,
esters or amides of saturated aliphatic carboxylic acids,
ethers that derive from alcohols and ethylene oxide,
nonpolar propylene waxes,
nucleating agents,
fillers, such as glass fibers, nanotubes, wollastonite, chalk, preferably with boric acid or with derivatives thereof, as synergists,
impact-modified polymers, in particular those based on ethylene-propylene (EPM) rubbers, or on ethylene-propylene-diene (EPDM) rubbers, or on thermoplastic polyurethanes,
flame retardants,
plasticizers,
coupling agents,
dyes and pigments,
further formaldehyde scavengers, zeolites or polyethyleneimines, or melamine-formaldehyde condensates,
antioxidants, in particular those having phenolic structure, benzophenone derivatives, benzotriazole derivatives, acrylates, benzoates, oxanilides, and sterically hindered amines (HALS=hindered amine light stabilizers).

These additives are known and are described by way of example in Gächter/Müller, Plastics Additives Handbook, Hanser Verlag Munich, 4th edition 1993, Reprint 1996.

The amount of the additives depends on the additive used and on the desired action. The conventional amounts are known to the person skilled in the art. If concomitant use is made of the additives, they are added, for example individually or together, in the usual manner as such, or as a solution or suspension, or preferably in the form of masterbatch.

The POM molding composition can be produced in a single step, by, for example, mixing the POM and, if appropriate, the additives in an extruder, kneader, mixer, or other suitable mixing apparatus, with melting of the POM, diskharging the mixture, and then usually pelletizing the same. However, it has proven advantageous to begin by premixing some or all of the components "cold" in a dry mixer or any other mixing apparatus and, in a second step, to homogenize the resultant mixture with melting of the POM—if appropriate with addition of further components—in an extruder or other mixing apparatus. In particular, it can be advantageous to premix at least the POM and the antioxidant (if used concomitantly).

The POM molding composition can be used in the form of chips, powder, beads, lenticular pellets, or preferably in granulated form.

The POM molding composition used as input to the low-temperature grinding process is preferably used in granulated form. The low-temperature grinding process per se, also termed cryogenic grinding, is known (e.g. DE 4421454 A1). The temperatures used in the invention are from −20 to −80° C., preferably from −30 to −60° C. The cooling can by way of example be achieved with the aid of liquid nitrogen. It is advantageous here to precool the input material, for example to temperatures of from −130 to −110° C., so as to achieve homogenous cooling, also within the mill.

A rotary mill is generally used for the low-temperature grinding of the POM molding composition, and in order to achieve an average particle size of 60 μm it is preferable to use a contrarotating pin mill. The contrarotating pin mill is a rotary mill whose grinding disks have concentrically arranged pins. Since both disks rotate, rotation rates of from at least 200 up to 250 m/s can be achieved. An example of a suitable pin mill is the Contraplex 160 C from Hosokawa Alpine GmbH. The d50 average particle size of the ground product after the low-temperature grinding process is generally 60 μm. Particles with size smaller than 30 μm (fines) and particles with size greater than 130 μm (coarse fraction) are removed from the ground product, and two steps are generally used here, to remove the coarse fraction first and then the fines. The ground product can by way of example be fractionated by sieving, using a tumbling sieve machine (suitable only for coarse fraction) or preferably by pneumatic separation, using a pneumatic separator with a deflector wheel. By way of example, a Micron MS-1 pneumatic separator from Hosokawa is suitable.

The invention further provides the use of the powder of the invention for producing moldings by selective laser sintering, and also provides moldings produced by an SLS process using the POM powder of the invention.

Selective laser sintering processes are well known and are based on the selective sintering of polymer particles, where layers of polymer particles are briefly exposed to laser light and the polymer particles that have been exposed to the laser light are fused. In the course of the manufacturing process, the polymer powder is applied layer-by-layer, and the powder located within the plane of intersection with the component is selectively melted by the laser beam and firmly bonded to the layer of melt located thereunder. The nonmolten powder supports the melt that is produced. The shape of the component formed by the melt is thus generated. Successive sintering of layers of polymer particles produces three-dimensional objects. Once all of the layers of the component have been produced, the powder cake with the internal components is cooled, and the components solidified. After the construction process, the surrounding powder can be removed, and the component can be passed onward to posttreatment steps, e.g. glass-bead blasting, trowalizing, and coating. Details of the selective laser sintering process can be found by way of example in the following specifications: U.S. Pat. No. 6,136,948 and WO 96/06881.

The SLS process usually uses a $CO_2$ laser, and this is also advantageously used for producing the POM moldings of the invention, since at the wavelength of the $CO_2$ laser ($\lambda$=10.6 μm) POM absorbs most of the energy introduced. The thickness of the layer of the POM powder of the invention is preferably from 0.08 to 0.20 mm. The laser power used for the SLS of the POM powder of the invention is preferably from 7 to 10 W. The scan width, i.e. the distance between the laser scan lines, is preferably from 0.08 to 0.15 mm.

In one preferred embodiment, the SLS process is carried out isothermally, i.e. there can be melt and powder adjacent to one another, and this means that the construction process uses a mixed state involving two phases. The energy introduced here into the POM powder of the invention is only that necessary to bring about the solid-liquid phase transition. The appropriate construction-chamber temperature for the POM powder of the invention is from 152 to 154° C. In relation to strength and modulus of elasticity, the moldings thus obtained by means of SLS from the POM powder of the invention achieve mechanical properties similar to those of injection-molded test specimens. Said moldings are in particular used as prototypes of components.

EXAMPLES

Example 1

Production of Powder

The powder of invention was produced by using granulated polyoxymethylene copolymer (bulk density about 850 g/l) with MVR of 42 cm$^3$ (at 190° C., using 2.16 kg to ISO 1133), Mn=23 000 g/mol, Mw=97 000 g/mol, Mw/Mn=4.2, and isothermal crystallization time of 3.5 minutes at 152° C. The granulated POM was cooled to −120° C. by way of a feed section and conveyor section and then milled at low temperatures (−50° C.) in a contrarotating Hosokawa Alpine Contraplex 160 C pin mill with rotor speed of 202 m/s to give a particle size of at most 250 μm. The coarse and fine product were then removed from the ground product by pneumatic separation, using a Hosokawa MS-1 pneumatic separator with a deflector wheel.

Particle size was determined by a Mastersizer S laser-diffraction spectrometer from Malvern Instruments Ltd.

The proportion of useful product, i.e. of the desired particle-size fraction from 30 to 130 μm or from 40 to 100 μm, was 94% and, respectively, 82%. The average particle size of the powder obtained was 60 μm.

Production of Tensile Specimens

An open-topped box measuring 20×20 cm was provided with a base which can be moved by way of a spindle. The base was moved to a position half a centimeter from the upper rim; the remaining space was filled with the POM powder of the invention, and this was smoothed by a doctor blade. The thickness of the layer was 0.1 mm. The apparatus was placed in the construction chamber of a $CO_2$-laser sintering system from 3DSystems, and the laser was used to trace the profiles of 3 horizontal tensile specimens (dumbbell specimens to DIN EN ISO 3167, Type A) per layer into the powder layer. The temperature of the construction chamber was 154° C. Experimental series E1 to E4 used different laser power and laser scan width (see FIG. 1). The next steps were repeated a number of times, and were: rotation of the spindle to lower the base by 0.1 mm, and application and smoothing of the next layer of powder, and then another irradiation by the $CO_2$ laser to melt the powder. Once the system used for the experiment had been cooled, the tensile specimens were available for the tensile tests below.

Component Testing

The tensile tests were carried out to DIN EN ISO 527-1 and -2. Separation velocity was 5 mm/min.

FIG. 1 shows the mechanical properties of the tensile specimens produced from the laser-sintered POM powder of example 1.

In examples E1 to E4 the laser power ($P_{laser}$ [W], $P_{out}$[W]) and the distance between the laser scan lines ($z_{scan}$ [mm]) were:

$P_{laser}$ [W], $P_{out}$[W], $Z_{scan}$ [mm]
E1: 2×5 W, 4.5 W, 0.15 mm
E2: 9 W, 4.5 W, 0.08 mm
E3: 9 W, 4.5 W, 0.15 mm
E4: 10 W, 4.5 W, 0.08 mm FIG. 1 shows that tensile specimens made of the POM powder of the invention have markedly improved tensile strain at break in comparison with POM specimens of the prior art [Rietzel et al. (Kunststoffe 2/2008, p. 67)]. The tensile strain at break of tensile specimens of E3 is about twice as high, at about 5%.

The invention claimed is:

1. A polyoxymethylene powder which is intended for selective laser sintering and which has the following parameters:

| | |
|---|---|
| Isothermal crystallization time (at 152° C.) | >3 min |
| Mn | from 22,000 to 25,000 g/mol |
| Mw | from 60,000 to 140,000 g/mol |
| Mw/Mn | from 3 to 5 |
| MVR | from 15 to 70 [cm$^3$/10 min] |
| d50 average particle size | 60 μm |
| Particle size | from 30 to 130 μm. |

2. The powder according to claim 1, wherein the MVR is from 30 to 50 [cm$^3$/10 min].

3. The powder according to claim 2, the particle size of which is from 40 to 100 μm.

4. The powder according to claim 3, wherein Mw is from 85,000 to 105,000 g/mol and the Mw/Mn ratio is from 3.7 to 4.5.

5. The powder according to claim 1, the particle size of which is from 40 to 100 μm.

6. The powder according to claim 1, wherein Mw is from 85,000 to 105,000 g/mol and the Mw/Mn ratio is from 3.7 to 4.5.

* * * * *